(12) United States Patent
Weiss (10) Patent No.: US 10,492,965 B2
(45) Date of Patent: Dec. 3, 2019

(54) GRAVITY REACTIVE BRAKING SYSTEMS FOR WHEELS

(71) Applicant: Yaron Weiss, Shim'a (IL)

(72) Inventor: Yaron Weiss, Shim'a (IL)

( * ) Notice: Subject to any disclaimer, the term of this patent is extended or adjusted under 35 U.S.C. 154(b) by 0 days.

(21) Appl. No.: 16/314,632

(22) PCT Filed: Jul. 4, 2017

(86) PCT No.: PCT/IL2017/050746
§ 371 (c)(1),
(2) Date: Dec. 31, 2018

(87) PCT Pub. No.: WO2018/008022
PCT Pub. Date: Jan. 11, 2018

(65) Prior Publication Data
US 2019/0247250 A1    Aug. 15, 2019

(30) Foreign Application Priority Data

Jul. 6, 2016    (IL) .......................................... 246622

(51) Int. Cl.
*A61G 5/10*    (2006.01)
*B62B 5/04*    (2006.01)

(52) U.S. Cl.
CPC .......... *A61G 5/1008* (2013.01); *A61G 5/1018* (2013.01); *A61G 5/1086* (2016.11); *B62B 5/04* (2013.01)

(58) Field of Classification Search
CPC .......... A61G 5/08; A61G 5/10; A61G 5/1018; F16D 49/00

(Continued)

(56) References Cited

U.S. PATENT DOCUMENTS

| 4,733,755 A | 3/1988 | Manning |
| 4,987,978 A * | 1/1991 | Jungersen ............ A61G 5/1018 |
| | | 188/2 F |

(Continued)

FOREIGN PATENT DOCUMENTS

DE    20009221    3/1988

OTHER PUBLICATIONS

International Search Report and Written Opinion for the related application No. PCT/IL2017/05076 dated Oct. 2, 2017.

*Primary Examiner* — Christopher P Schwartz
(74) *Attorney, Agent, or Firm* — Honigman LLP (57) ABSTRACT

A gravity reactive braking system comprises a housing connected to a structural element of a manually powered wheeled unit; a guide wheel having a first sector of radially protruding elements positionable in drivable contact with a main wheel periphery, and a second sector with a circular periphery of a shorter radial length than the first sector; a plate configured with a cammed surface; a height adjustment unit; and a follower element connected to a brake assembly cable and pivotably mounted onto the housing, for movably engaging a plate periphery. The guide wheel is rotatable in a rotational direction opposite to the main wheel's rotational direction when the radially protruding elements are positioned in drivable contact with the main wheel periphery following suitable manipulation of the height adjustment unit, and is indexable a predetermined angle until a desired region of the guide wheel is in contact with the main wheel periphery.

20 Claims, 9 Drawing Sheets (58) Field of Classification Search
USPC ........ 188/2 F, 19, 20, 30, 31, 74; 280/242.1, 280/250.1, 304.1
See application file for complete search history.

(56) References Cited

U.S. PATENT DOCUMENTS

| | | | |
|---|---|---|---|
| 6,655,503 B1* | 12/2003 | Moody | A61G 5/10 |
| | | | 188/2 F |
| 6,805,371 B2 | 10/2004 | Meginniss, III et al. | |
| 7,316,298 B2* | 1/2008 | Yeager | A61G 5/10 |
| | | | 188/17 |
| 8,381,883 B2* | 2/2013 | Lo | F16D 49/00 |
| | | | 188/2 F |
| 2001/0018997 A1* | 9/2001 | Suganuma | A61G 5/1018 |
| | | | 188/2 F |
| 2008/0128227 A1 | 6/2008 | Yeager | |

\* cited by examiner

GRAVITY REACTIVE BRAKING SYSTEMS FOR WHEELS

FIELD OF THE INVENTION

The present invention relates to the field of braking systems. More particularly, the invention relates to a gravity reactive braking system for a wheeled unit.

BACKGROUND OF THE INVENTION

A person being transported on a wheeled unit, such as a wheelchair, stroller and tricycle, is dependent upon a caregiver for responsibly directing the wheeled unit to an intended destination. During periods of carelessness or forgetfulness, however, the caregiver at times releases his or her grip on the wheeled unit. The caregiver usually remembers to quickly grasp the wheeled unit once again, but if the wheeled unit is advancing on an inclined surface, the wheeled unit will uncontrollably roll in a descending direction as a result of the momentary release of grip to endanger the person being transported. The person being transported generally is incapable of preventing the uncontrollable rolling condition.

One prior art gravity reactive braking system is mounted on an electric wheelchair, which provides automatic braking. However, the cost of such an automatic braking system is exorbitant.

It would therefore be desirable to provide a gravity reactive braking system for use in conjunction with a manually powered wheeled unit.

Another prior art gravity reactive braking system is disclosed in U.S. Pat. No. 7,316,298. A speed pacer braking assembly includes a downhill activator for selectively engaging a disc brake system when a predetermined incline is reached while descending in a forward direction. The downhill activator comprises a weighted pendulum with a weighted head that pushes against the inner ring of a safety bearing which is integral with the wheel axle when a down slope is encountered to overcome the inner bias of an internal spring and to cause the inner ring to engage an outer ring of the safety bearing. A braking force previously applied to the disc brake is thus communicated to the outer ring by interlocking gear teeth to result in a corresponding change in rotational speed of the axle. An anti-rollback assembly comprises cams which are provided with teeth for interlocking with cooperating teeth of the inner ring of the safety bearing when the wheelchair frame is positioned at an incline, so that rearward rotation of the wheels are prevented in that direction, while freewheeling in forward and rearward directions is permitted when the wheelchair frame is positioned on a level surface as a result of the clearance between the cam teeth which are provided with teeth for interlocking with cooperating teeth of the inner ring teeth.

This prior art gravity reactive braking system is costly due the need of a separate mechanism for both the downhill activator and the anti-rollback assembly, and also due the need of manufacturing precision cut teeth from metallic material to avoid excessive wear as a result of the significant stress to which the teeth are subjected.

Another expensive to manufacture manual wheelchair is disclosed by U.S. Pat. No. 6,805,371, which comprises a two-gear arrangement. The gear assembly includes two spaced cage plates which are joined by fixed shafts having unidirectional rollers positioned thereon around the periphery thereof. The rollers have an exterior surface portion which engages with the interior surface of the gear assembly housing in such a way as to readily permit movement in the forward direction, but to prevent movement in the rear direction, unless the hand rims are used to rotate the housing relative to the gear assembly. The cage plate structure has rubbing elements which interact with the interior surface of the housing to pbaruce an additional braking force for downhill terrain.

It is an object of the present invention to provide an inexpensively manufacturable gravity reactive braking system for a manually powered wheeled unit.

It is an additional object of the present invention to provide a gravity reactive braking system for a manually powered wheeled unit that employs a same mechanism for both a downhill brake assembly and an anti-rollback assembly.

Other objects and advantages of the invention will become apparent as the description proceeds.

SUMMARY OF THE INVENTION

The present invention provides a gravity reactive braking system, comprising a housing connected to one or more structural elements of a manually powered wheeled unit; a guide wheel configured with at least one sector of radially protruding elements positionable in drivable contact with a periphery of a main wheel of the wheeled unit, and with at least one sector having a circular periphery which is configured without any of said radially protruding elements and of a shorter radial length than said at least one sector of radially protruding elements; a plate configured with a cammed surface; a height adjustment unit secured to said housing, for selectively retaining a horizontal post on which said guide wheel and said cammed plate are rotatably and coaxially mounted at one of a plurality of vertically spaced positions; and a follower element connected to a cable of a brake assembly and pivotably mounted onto said housing, for movably engaging a periphery of said plate.

Said guide wheel is rotatable in a rotational direction opposite to the rotational direction of the main wheel when the radially protruding elements of a given one of the sectors of said guide wheel are positioned in drivable contact with said main wheel periphery following suitable manipulation of said height adjustment unit, and is indexable a predetermined angle subtended by said given sector until a desired region of said guide wheel is placed in contact with said main wheel periphery.

Rotation of said plate is synchronized with rotation of said guide wheel to ensure that said follower element will be engaged with said cammed surface and will be consequently caused to rise and to thereby increase tension in the cable for applying a braking force onto said main wheel in conjunction with said brake assembly, when said desired region of said guide wheel is placed in contact with said main wheel periphery.

The braking system is operable in one of the following modes:
1) in a downhill mode when the post is set to a lowermost height and an intermediate-level braking force is applied to one or more of the main wheels which are advancing in a downhill direction, wherein the cammed surface with which the follower element is engageable and by which it is consequently caused to rise is a concave seating peripheral portion, the radially protruding elements of the given sector of the guide wheel being positionable in drivable contact with the periphery of the main wheel to cause rotation of the guide wheel until the follower element is received in said seating peripheral portion to prevent further rotation of the guide wheel;

2) in an uphill mode to apply a braking force onto the main wheel during an unanticipated downhill rolling event, whereby the guide wheel is caused to be driven in a first rotational direction to a standby position such that a first transitional tooth region of the given sector is set in drivable contact with the main wheel periphery, while the wheeled unit is advancing in an uphill direction, and is configured to be indexed for the predetermined angle subtended by the given sector in in a second rotational direction opposite to the first direction, from the standby position until a second transitional tooth region of the given sector is positioned in drivable contact with the main wheel periphery, during the unanticipated downhill rolling event; and 3) in a level mode when the post is set to an uppermost height to ensure that all of the radially protruding elements will be spaced above the main wheel periphery and that the guide wheel will remain at a same angular position due to lack of contact between the radially protruding elements and the main wheel.

In one aspect, the guide wheel is also configured with a ramped surface tangentially extending from the circular periphery thereof to an adjacent transitional region, to facilitate application of an intermediate-level braking force and sliding of the main wheel along said ramped surface even though further rotation of the guide wheel is prevented by the engagement between the follower element and the seating peripheral portion.

In one aspect, the main wheel is movable in a reverse direction during the downhill mode, whereupon a detent causes the guide wheel to be locked to prevent return of the follower element to the seating peripheral portion after being disengaged therefrom. The guide wheel may be configured with one or more detents that extends tangentially from one of the circular periphery sectors and that has a seat, the braking system further comprising a pivotable lever mounted onto the housing such that an unattached end of said lever is rollingly engageable with said one circular periphery sector and is receivable in the seat of each of said one or more detents following movement of the main wheel to lock the guide wheel.

DETAILED DESCRIPTION OF PREFERRED EMBODIMENTS

In the gravity reactive braking system of the present invention, a follower bar connected to a cable of a brake assembly is urged to be intermittently displaced by a guide wheel which is rotatably mounted onto a drive unit housing connected to structural elements of a manually powered wheeled unit. A braking action is automatically initiated as a result of a limited rotation of the guide wheel which causes the follower bar to rise and to thereby increase tension in the cable.

As opposed to prior art gravity reactive braking systems which rely on a mechanical interlocking action by precisely and expensively manufactured metallic elements that are needed to ensure structural integrity of the interlocking elements despite the relatively large stress to which they are subjected during prevention of an unwanted downhill rolling event, the gravity reactive braking system of the present invention is responsive to an indexing operation of the guide wheel while being driven by a main wheel of the wheeled unit. The guide wheel is able to be driven by the main wheel by being configured with circumferentially spaced, radially protruding elements, which serve to grip and maintain pressing contact with the periphery of the main wheel. During an indexing operation, the guide wheel is allowed to rotate an exact predetermined angle by being configured with sectors of different radial length. An interface between adjacent sectors is characterized by an abrupt change in radial length of the protruding elements to cause termination of the indexing operation when a given guide wheel sector ceases to grip the main wheel periphery.

Since a braking action is initiated as a result of an indexing operation due to pressing contact between the guide wheel and the main wheel, rather than by means of precisely manufactured interlocking elements, the guide wheel protruding elements as well as other elements of the braking system of the present invention may be produced by the manufacturing technique of additive manufacturing, normally known as 3-D printing. The guide wheel may therefore be manufactured from inexpensive polymeric material, although a metallic guide wheel is also in the scope of the invention.

The following description relates to a wheeled unit in the form of a wheelchair, although the teachings of the present invention are also applicable to other types of wheeled units, such as a stroller and tricycle.

Figure 1:
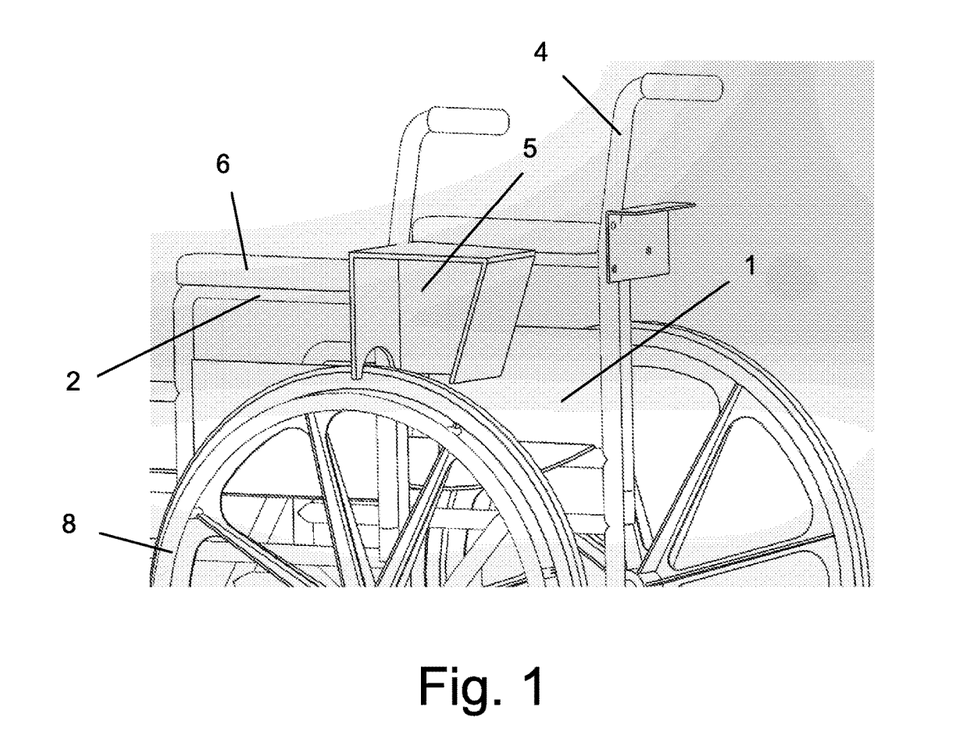
FIG. 1 is a perspective view from the side of a wheeled unit on which is mounted a drive unit housing.
Figure 2:
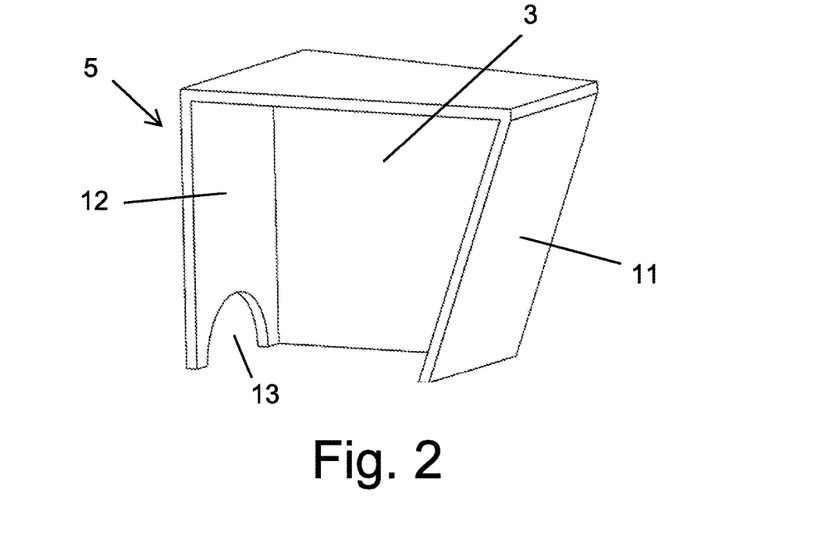
FIG. 2 is a perspective view from the side of the housing of FIG. 1, when removed from the wheeled unit.

FIGS. 1 and 2 illustrate drive unit housing 5, which is mounted externally on structural elements of wheelchair 1, such as frame 2 or push handle 4. Housing 5 is a hollow structure having an exemplary trapezoidal configuration, with an inner wall 3, an outer wall (not shown for clarity) for enclosing and protecting the drive unit, and two side walls 11 and 12. Side wall 12 is formed with a semielliptical cutout 13 to accommodate the rotation of main wheel 8.

Figure 3:
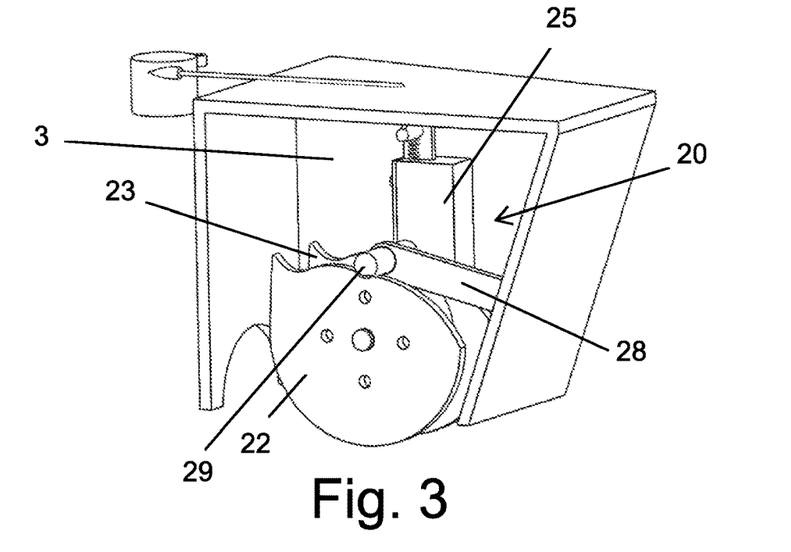
FIG. 3 is a perspective view from the side of a drive unit according to one embodiment of the present invention when mounted within the housing of FIG. 1, when removed from the wheeled unit.

FIG. 3 illustrates drive unit 20 when mounted on the housing inner wall 3. Drive unit 20 comprises identical cammed plates 22 and 23 coaxial with, and between which is interposed, the guide wheel, height adjustment unit 25 for defining the mode of operation for the braking system, and follower bar 28 terminating with inner and outer rollers 29 for rollingly engaging the periphery of cammed plates 22 and 23, respectively.

It will be appreciated that drive unit 20 may comprise only one cammed plate.

Figure 4:
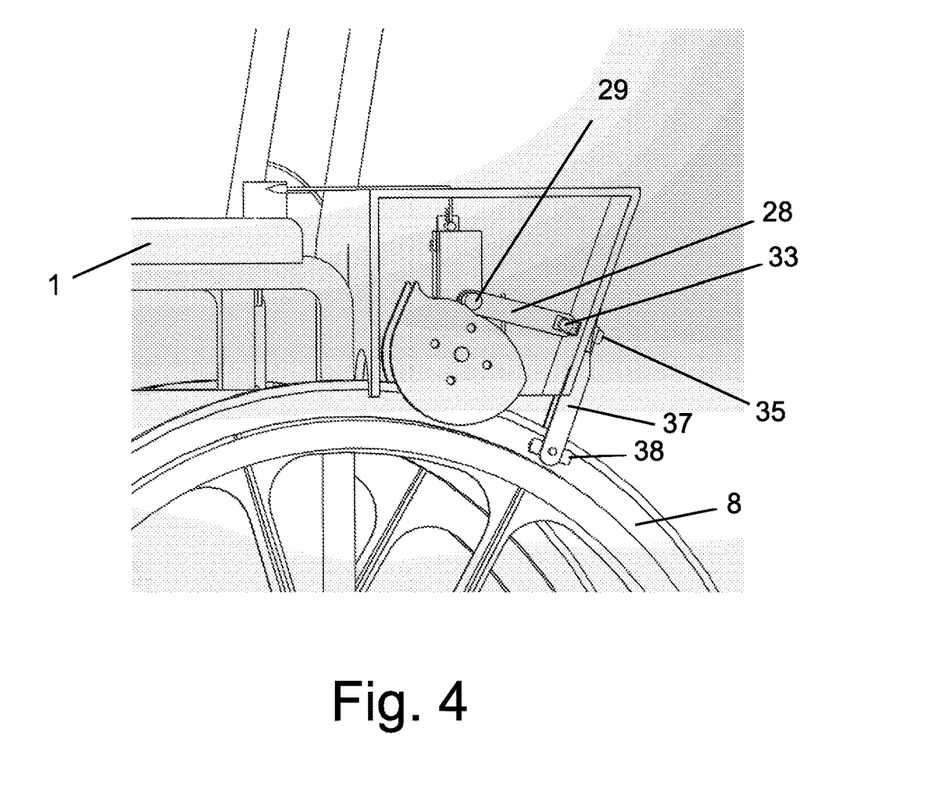
FIG. 4 is a perspective view from the side of the drive unit of FIG. 3, shown when mounted on the wheeled unit.

As shown in FIG. 4, a first end of follower bar 28 distant from rollers 29 is pivotably mounted onto housing inner wall 3 by means of element 33. A central section of follower bar 28 is connected in turn to the cable of brake assembly 35, for example a Bowden cable, enabling the rolling engagement between rollers 29 and the periphery of cammed plates to be cable loaded. The cable-loaded rolling engagement is able to be maintained despite a change in angle of follower bar 28 in response to rotary motion of the cammed plates. Brake assembly 35 may be of the caliper type wherein two arms 37 extend downwardly from a pivoting member which is connected to the cable and hold a corresponding brake pad 38 at opposite sides of main wheel 8. When follower bar 28 is caused to rise, arms 37 move together and brake pads 38 squeeze main wheel 8. It will be appreciated that brake assembly 35 may be any other suitable cable actuated brake well known to those skilled in the art.

Figure 18:
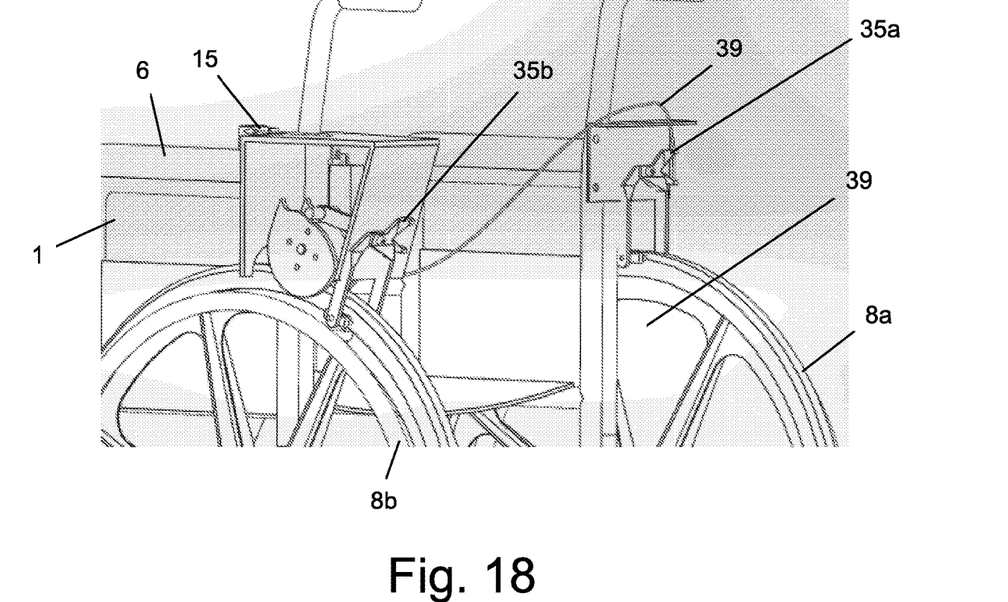
FIG. 18 is a perspective view from the rear of the wheeled unit of FIG. 1, showing a cable for equalizing an applied braking force.

A cable 39 connected to right and left brake assemblies 35a-b may be used to equalize the braking force applied to right and left main wheels 8a-b, respectively, as shown in FIG. 18.

Figure 5:
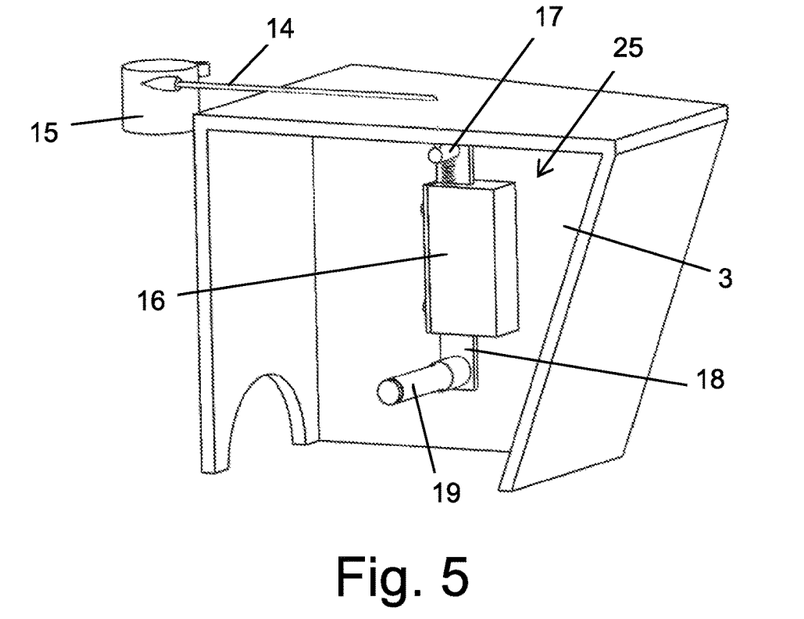
FIG. 5 is a perspective view from the side of the housing of FIG. 1, when removed from the wheeled unit and showing a height adjustment unit mounted thereon.

Height adjustment unit 25 is illustrated in FIG. 5. Height adjustment unit 25 comprises hollow mount 16 attached to housing inner wall 3, a bar 18 that is vertically displaceable within the interior of mount 16, and a substantially horizontal post 19 functioning as a camshaft outwardly extending from a bottom region of bar 18. Height adjustment unit 25 also comprises a releasable locking member (not shown) in engagement with bar 18 for retaining post 19 at a desired height, depending on the selected mode that was selected, whether the level mode, uphill mode or downhill mode, as will be described hereinafter. The locking member may be spring loaded. An actuator 15, such as a lever, positioned on an armrest 6 of wheelchair 1 (FIG. 18) or on any other accessible element of the wheelchair is used, when actuated, is used to adjust the height of post 19. Cable 14, e.g. a Bowden cable, extends from actuator 15 to a connector 17 at the upper end of bar 18.

Figure 6:
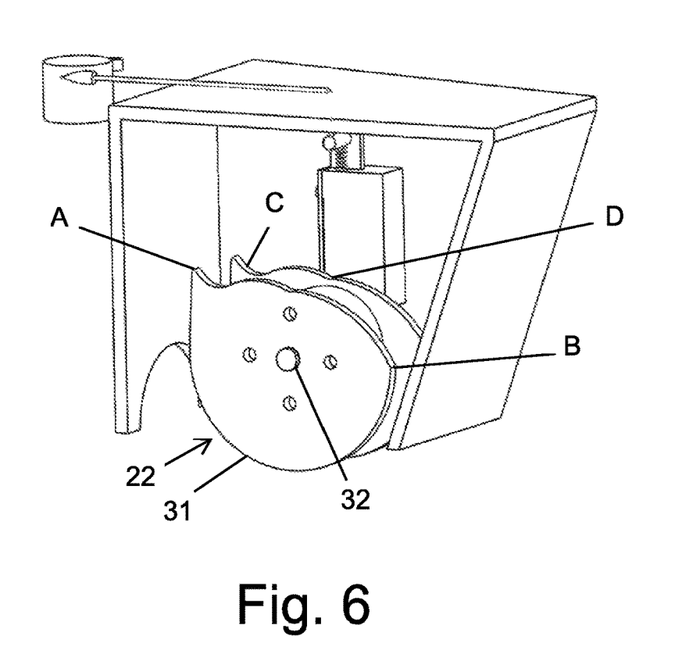
FIG. 6 is identical to FIG. 3 but without the follower bar, showing the structure of the cammed plates.

An explanation of the configuration of cammed plate 22 will be presented with reference to FIG. 6. Cammed plate 22 provided with a substantially round periphery 31 has a uniform thickness, with the exception of central aperture 32 defining its center of rotation and, optionally, additional apertures for material savings. The periphery 31 of cammed plate 22 is formed of three portions—an upper arcuate peripheral portion extending from region B to region C, a circular peripheral portion extending from region A to region B and subtending an angle of greater than 180 degrees, e.g. 220 degrees, and a concave seating peripheral portion extending from region A to region C.

The circular peripheral portion is separated from central aperture 32 by a uniform radius, while the arcuate peripheral portion is separated from central aperture 32 by a varied distance which is less than the radius of the circular peripheral portion. Region B at the interface between the arcuate peripheral portion and the circular peripheral portion constitutes the region along the arcuate peripheral portion which is spaced by the longest distance from central aperture 32 and therefore provides the maximum follower bar rise.

The arcuate peripheral portion may be convex, and may be provided with a small concave region D centrally located along the arcuate peripheral portion, to urge the follower bar to a starting position.

The concave seating peripheral portion extends continuously and smoothly from region C at one end of the arcuate peripheral portion to region A at one end of the circular peripheral portion, to allow passage of the follow bar from the arcuate peripheral portion to the seating peripheral portion. Region A constitutes a discontinuity, possibly shaped as a pointed end, to present additional displacement of the follow bar beyond region A.

Figure 7:
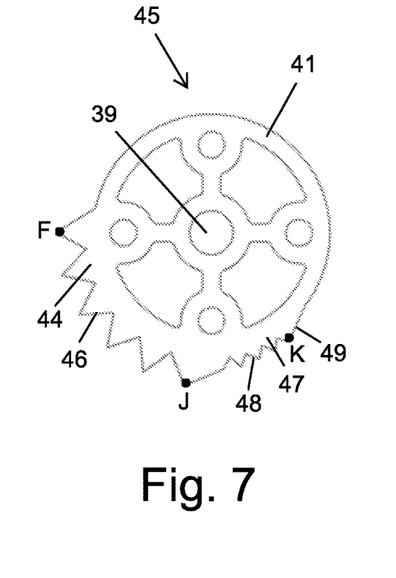
FIG. 7 is a side view of a guide wheel, according to one embodiment of the invention.

FIG. 7 illustrates guide wheel 45, shown to be of openwork construction for material savings, but may be of solid construction if desired. Guide wheel 45 has a central aperture 39 which is mountable on post 19 (FIG. 5) together with the central aperture 32 of each cammed plate (FIG. 6).

Guide wheel 45 is configured with three sectors: (1) sector 41 of the shortest radial length and having a circular periphery without any radially protruding elements, (2) sector 44 having the longest radial length, and (3) sector 47. Sector 44 circumferentially extends from transitional region F adjacent to sector 41 to transitional region J adjacent to sector 47, and sector 47 circumferentially extends from transitional region J to transitional region K adjacent to sector 41, for example by a shorter circumferential length than the circumferential length of sector 44. As referred to herein, a "transitional region" is the last circumferentially located region of a given sector that is able to provide pressing contact with the main wheel, depending on the selected mode.

A ramped surface 49 tangentially extends from the circular periphery of sector 41 to transitional region K, to provide a sliding action that is beneficial during the downhill mode, as will be described hereinafter. If so desired, a ramped surface 49 may tangentially extend from the circular periphery of sector 41 to transitional region F.

The radially protruding elements 46 and 48 of sectors 44 and 47, respectively, are shown to be of sawtooth construction, but it will be appreciated that they may be of any other desired configuration that provides pressing contact with the periphery of the main wheel.

The radius of guide wheel 45 from aperture 39 to the periphery of sector 41 is less than the distance from the central aperture of the cammed plates to the arcuate peripheral portion, to ensure that the follower bar rollers will engage the periphery of the cammed plates and not the periphery of sector 41.

Figure 8:
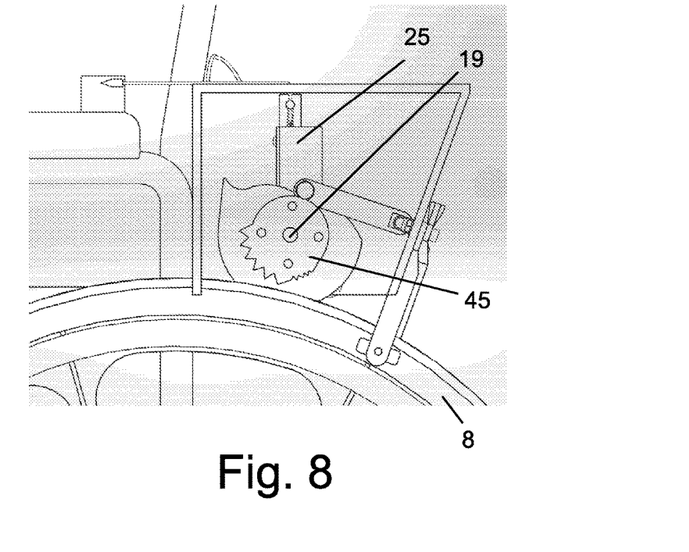
FIG. 8 is a side view of the drive unit of FIG. 3 when mounted on the wheeled unit, showing its operation during the level mode.

FIG. 8 illustrates the drive unit when post 19 is set by height adjustment unit 25 to an uppermost height during the level mode, whereby all of the radially protruding elements are spaced above the periphery of main wheel 8 and guide wheel 45 continuously remains at the same angular position due to the lack of contact between the radially protruding elements and the main wheel. Main wheel 8 is therefore able to advance uninterruptedly along a level surface.

Figure 9:
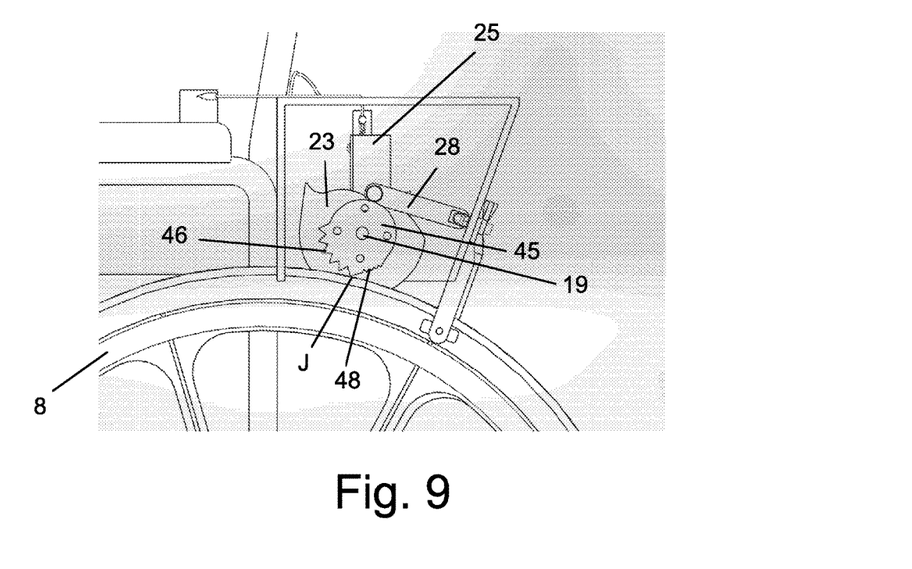
FIG. 9 is a side view of the drive unit of FIG. 3 when mounted on the wheeled unit, showing the follower bar when positioned at a starting position and the guide wheel positioned at a standby position.
Figure 10:
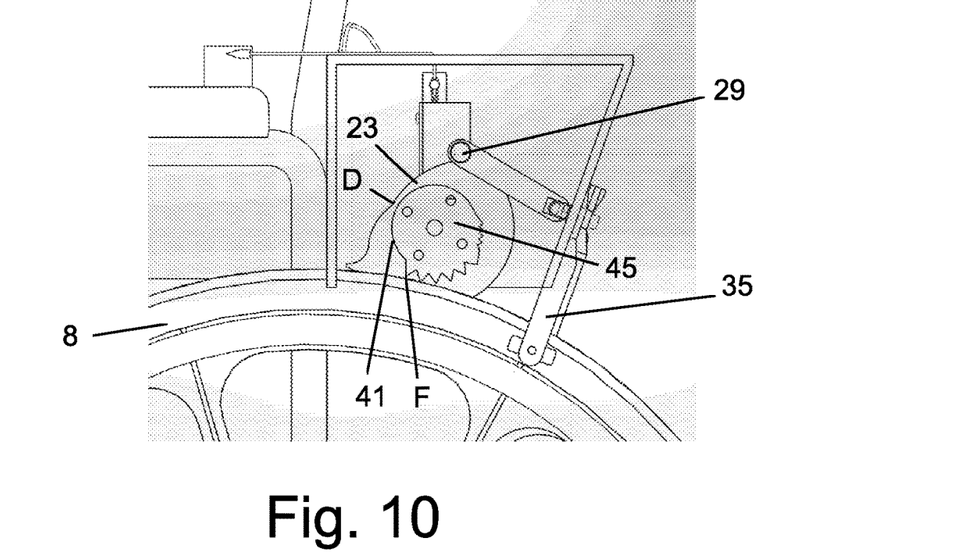
FIGS. 10 and 11 are a side view and a perspective view from the side, respectively, of the drive unit of FIG. 3 when mounted on the wheeled unit, showing its operation during the uphill mode.
Figure 11:
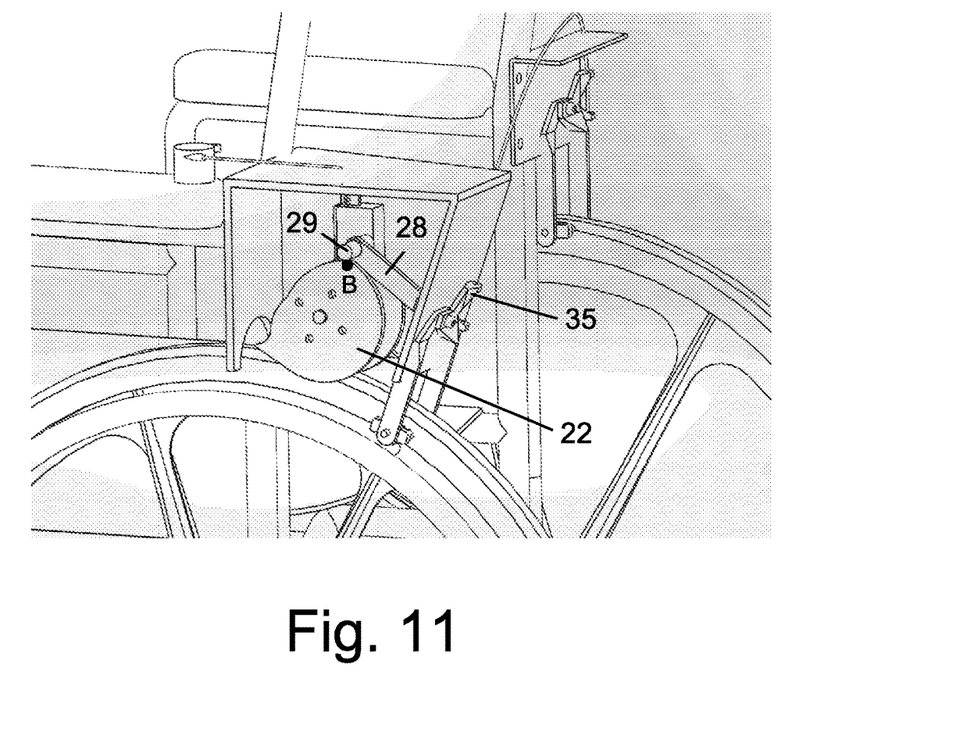

FIGS. 9-11 illustrate the drive unit when post 19 is set by height adjustment unit 25 to an intermediate height during the uphill mode, allowing large-sized teeth 46 of guide wheel 45 to be contacted and driven by the periphery of main wheel 8. Follower bar 28 is shown in FIG. 9 to be at the starting position while being seated, or otherwise dwelling, in concave region D.

While the wheelchair is being transported upwardly, main wheel 8 rotates in a counterclockwise direction according to the illustrated orientation and guide wheel 45 is driven thereby in a clockwise direction until it is rotated about post 19 to a standby position whereby transitional tooth region J is in drivable contact with the periphery of main wheel 8. Additional rotation of guide wheel 45 beyond transitional region J is prevented due to the lack of a gripping action between the small-sized teeth 48 and the periphery of main wheel 8.

During an unanticipated downhill rolling event caused for example after a caregiver or any other operator accidently released his or her grip from the push handle of the wheelchair, guide wheel 45 is immediately indexed for a predetermined angle in the counterclockwise direction from the standby position until transitional region F is positioned in drivable contact with the periphery of main wheel 8, as shown in FIG. 10, after main wheel 8 started to rotate downwardly in the clockwise direction and to drive guide wheel 45.

In response to this indexing operation, camming plates 22 and 23, which are coaxial with guide wheel 45, are also rotated for the same predetermined angle in the counterclockwise direction. Rollers 29 of follower bar 28 in rolling engagement with the arcuate peripheral portion of the cammed plates are consequently caused to be displaced to region B at the interface between the arcuate peripheral portion and the circular peripheral portion, as shown in FIG. 11. Follower bar 28 is consequently urged to rise at region B to a maximum extent due to the influence of the circular peripheral portion. The tension in the cable connected to brake assembly 35 is consequently significantly increased, to immediately apply a strong braking force that stops the rotation of main wheel 8.

Region B of the cammed plates and region F of guide wheel 45 may be aligned by an angular difference of 180 degrees, or by any other angular value, to synchronize application of a maximum braking force with the conclusion of the indexing operation. Upon application of the maximum braking force, guide wheel 45 will cease to rotate as it is no longer driven by a moving main wheel 8.

Alternatively, Region B of the cammed plates and region F of guide wheel 45 may be suitably aligned to synchronize application of an intermediate-level braking force with the conclusion of the indexing operation. Additional rotation of guide wheel 45 beyond transitional region F is prevented even though only an intermediate-level braking force is applied and main wheel 8 continues to rotate due to the lack of a gripping action between the periphery of sector 41 and the periphery of main wheel 8.

Figure 12:
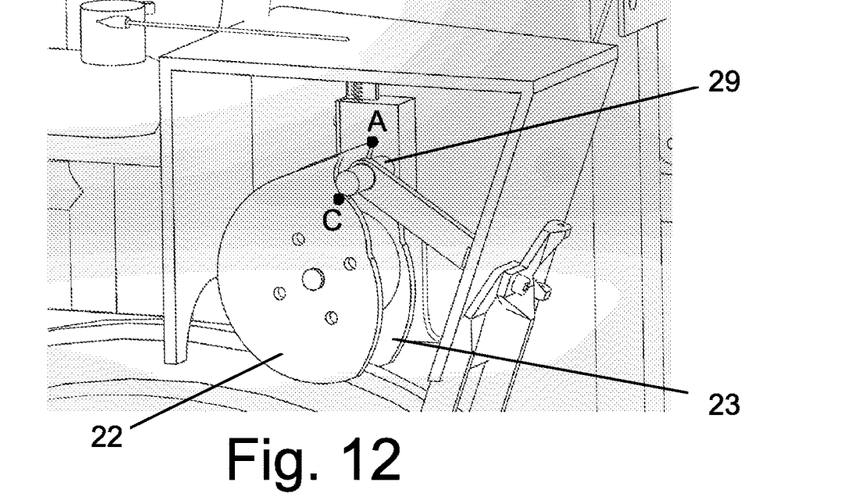
FIGS. 12 and 13 are a perspective view from the side and a side view, respectively, of the drive unit of FIG. 3 when mounted on the wheeled unit, showing its operation during the downhill mode.
Figure 13:
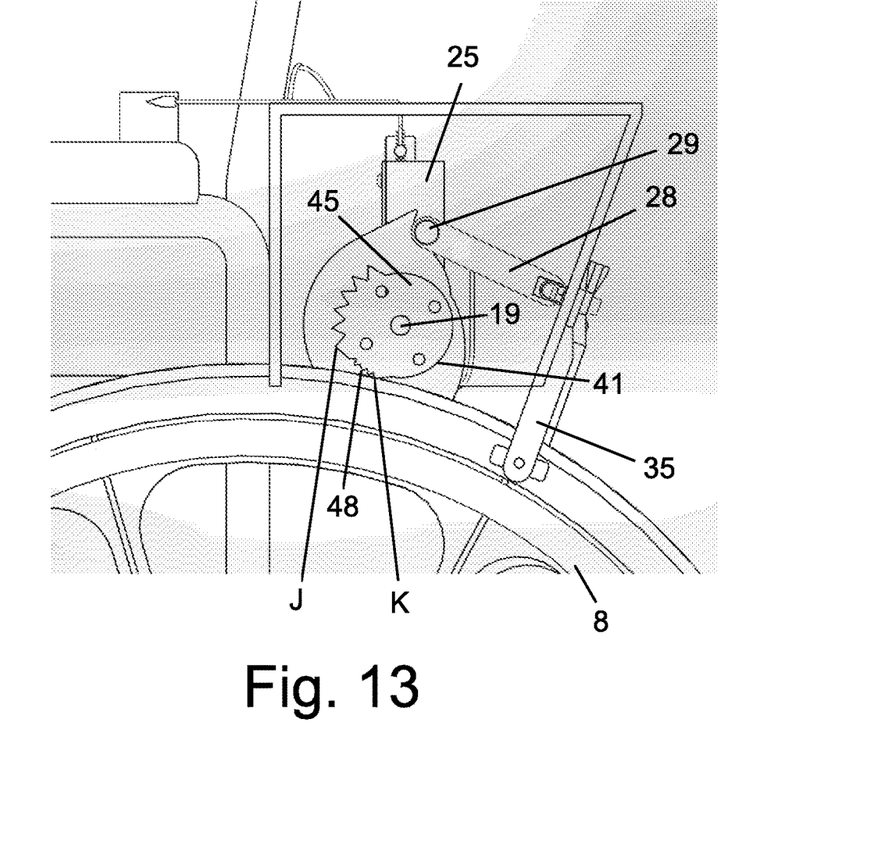

FIGS. 12-13 illustrate the drive unit when post 19 is set by height adjustment unit 25 to a lowermost height during the downhill mode, allowing small-sized teeth 48 of guide wheel 45 to be contacted and driven by the periphery of main wheel 8.

Follower bar 28 dwells initially at a starting position as shown in FIG. 9, and small-sized teeth 48 located between transitional tooth regions J and K of guide wheel 45 are positioned in drivable contact with the periphery of main wheel 8.

While the wheelchair is normally advancing in a downhill direction, main wheel 8 rotates in a counterclockwise direction according to the illustrated orientation and guide wheel 45 is driven thereby in a clockwise direction by means of the small-sized teeth 48. At the end of this indexing operation by guide wheel 45, ramped surface 49 adjacent to transitional tooth region K becomes positioned in contact with the periphery of main wheel 8. Even though ramped surface 49 has a shorter radial length than small-sized teeth 48, the ramped surface is able to be placed in engagement with main wheel 8 by virtue of the inherent resiliency of height adjustment unit 25 that is influential only during the downhill mode but not in the uphill mode.

In response to the indexing operation, camming plates 22 and 23 are also rotated for the same predetermined angle in the clockwise direction. Rollers 29 of follower bar 28 in rolling engagement with the arcuate peripheral portion of the cammed plates are consequently caused to be smoothly displaced first to region C at the interface between the arcuate peripheral portion and the concave seating peripheral portion and then to region A, or to any other region along the concave seating peripheral portion. Follower bar 28 is thus positively seated.

Since the distance from post 19 to the concave seating peripheral portion is greater than the distance therefrom to the arcuate peripheral portion, follower bar 28 is urged to rise to a partial extent when displaced to the concave seating peripheral portion. The tension in the cable connected to brake assembly 35 is consequently increased, to immediately apply a constant intermediate-level braking force that reduces the rate of rotation of main wheel 8 during downhill advancement and prevents an uncontrollable rolling condition.

Region C of the cammed plates and ramped surface 49 of guide wheel 45 may be aligned by an angular difference of 180 degrees, or by any other angular value, to synchronize application of an intermediate-level braking force with the conclusion of the indexing operation. During application of the intermediate-level braking force, guide wheel 45 will cease to rotate in the clockwise direction as a result of the reactive force applied by follower bar 28 while its rollers 29 are seated in a corresponding seating peripheral portion.

Even though additional rotation of guide wheel 45 in the clockwise direction is prevented, main wheel 8 being braked by an intermediate-level braking force is allowed to rotate in the counterclockwise direction relative to the stationary guide wheel by virtue of the sliding action provided by ramped surface 49.

FIGS. 14-17 illustrate another embodiment of the invention for enabling movement of the wheelchair in the reverse direction after advancing forwardly in the downhill mode. Since rise of the follower bar is achieved to initiate application of the intermediate-level braking force after having been displaced to the concave seating peripheral portion, unrestrained movement in the reverse direction can be carried out only when the follower bar is disengaged from the concave seating peripheral portion. The guide wheel is subsequently automatically locked to prevent return of the follower bar to the concave seating peripheral portion.

Figure 14:
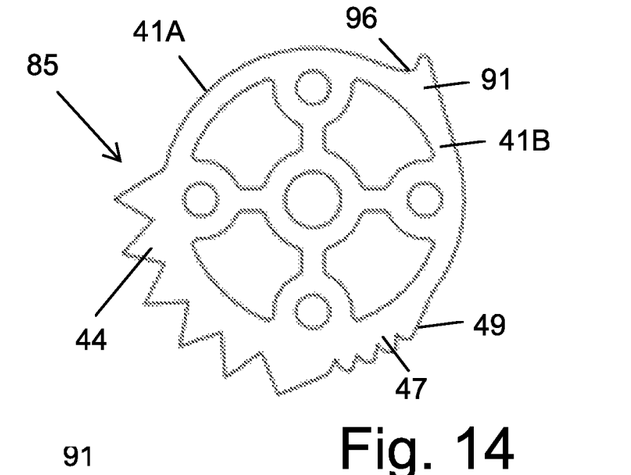
FIGS. 14 and 15 are a side view and a perspective view from the side, respectively, of a guide wheel according to another embodiment of the invention.
Figure 15:
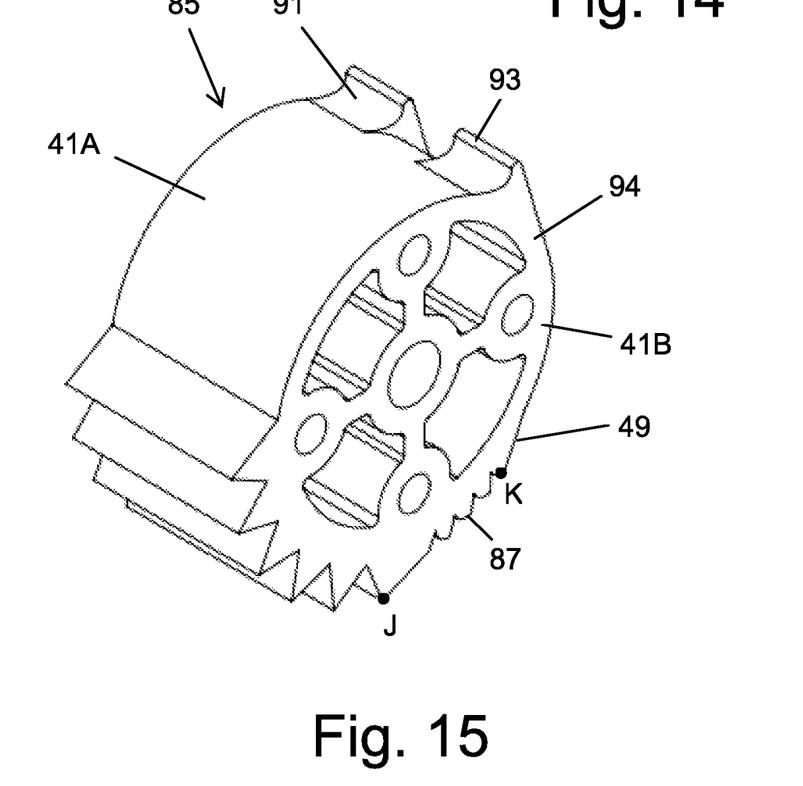

In this embodiment, sector 47 of guide wheel 85 circumferentially extending between transitional regions J and K is provided with rounded, small-sized radially protruding elements 87 to permit a sliding action with respect to the main wheel when the wheelchair is moved in the reverse direction. Sector 44 is identical to that of guide wheel 45 of FIG. 7.

Guide wheel 85 also has two circular periphery sectors 41A-3 of short radial length, as well as ramped surface 49 which tangentially extends from the circular periphery of sector 41B to transitional region K. Two axially spaced detent elements 91 are positioned between the two circular periphery sectors 41A-B. Alternatively, a single detent element 91 may be employed. Each detent element 91 is configured with a thickened wall 94 that extends tangentially from sector 41B so as to protrude slightly from sector 41A and with a concave seat portion 96 subtending an angle of approximately 90 degrees from its tip 93 to the circular periphery of sector 41A.

Figure 16:
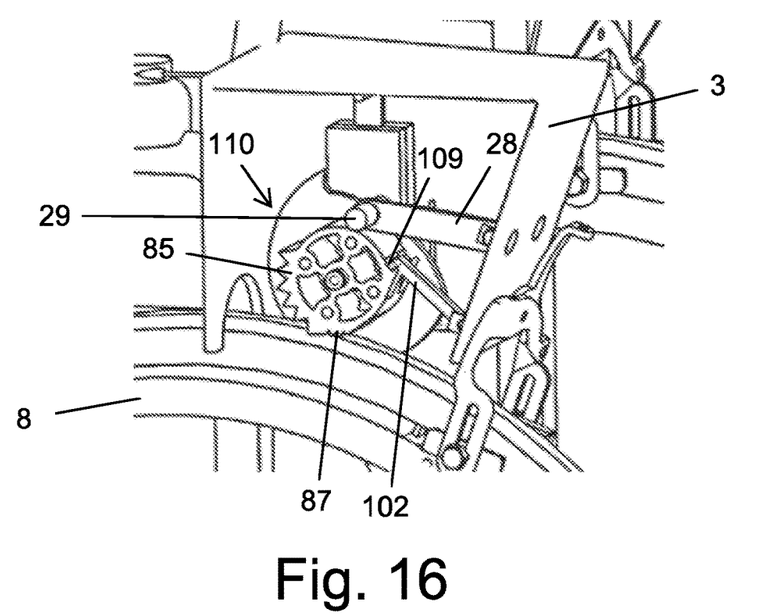
FIGS. 16 and 17 are a perspective view from the side and a side view, respectively, of a drive unit according to another embodiment of the invention, when mounted on the wheeled unit.
Figure 17:
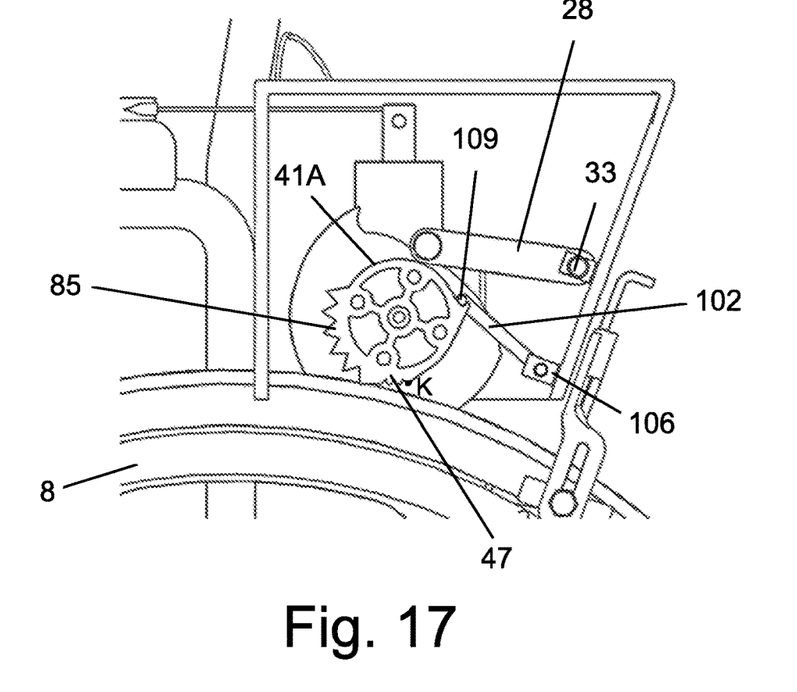

Drive unit 110 further comprises a pivoting lever 102 mounted onto housing inner wall 3 by means of element 106 and which is adapted to cooperate with detent elements 91. Element 106 is mounted below element 33 by which follower bar 28 is pivotably connected. Thus the unattached end of lever 102 which terminates with inner and outer rollers 109 is able to rollingly engage the periphery of sector 41A without interfering with follower bar 28.

During normal operation in the downhill mode, each roller 29 of follower bar 28 is received in a corresponding concave seating peripheral portion, ramped surface 49 is in sliding contact with main wheel 8, and each roller 109 of lever 102 is in engagement with a central region of sector 41A. When main wheel 8 is moved in the reverse direction, i.e. in the clockwise direction according to the illustrated orientation, guide wheel 85 is driven in the counterclockwise direction. Due to this counterclockwise movement of guide wheel 85, the concave seating peripheral portion is separated from the corresponding roller 29 and each roller 109 of lever 102 is caused to roll along the periphery of sector 41A until it is received within the corresponding seat portion 96 of detent element 91. Guide wheel 85 is thus locked in place to prevent an inadvertent return of follower bar 28 to the concave seating peripheral portion. Even though rotation of guide wheel 85 is prevented when locked by lever 102, main wheel 8 is allowed to slide along rounded elements 87 of sector 47 to permit unrestrained movement in the reverse direction.

Figure 19:
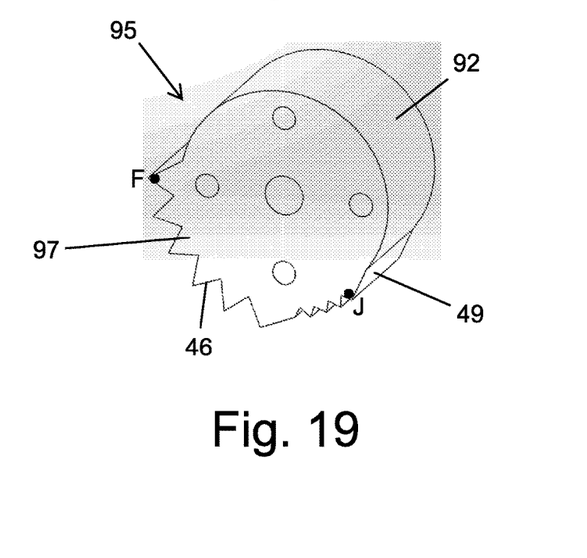
FIG. 19 is a perspective view from the side of a guide wheel according to another embodiment of the invention.

In another embodiment illustrated in FIG. 19, guide wheel 95 is configured with two sectors: (1) sector 92 of the shortest radial length and having a circular periphery, and (2) sector 97 circumferentially extending from transitional region F to transitional region J and configured with large-sized teeth 46. A ramped surface 49 tangentially extends from sector 92 to transitional region J.

Guide wheel 95 and the coaxial cammed plates of FIG. 6 cooperate with a height adjustment unit that is configured to set the post on which the guide wheel and cammed plates are rotatably mounted to only two predetermined heights.

The gravity reactive braking system is thus operable in the level mode and in the downhill mode. When the post is set to the lowermost height, large-sized teeth 46 are positioned in drivable contact with the periphery of the main wheel, to cause rotation of guide wheel 95 until the follower bar is received in the seating arcuate peripheral portion and further rotation of the guide wheel is prevented. An intermediate-level braking force is accordingly applied and the main wheel slides along ramped surface 49.

Alternatively, a gravity reactive braking system employing guide wheel 95 may be operable in the level mode and in the uphill mode. When the post is set to the lowermost height, large-sized teeth 46 are positioned in drivable contact with the periphery of the main wheel, to cause rotation of guide wheel 95 to a standby position and subsequently in an opposite rotational direction in response to an unanticipated downhill rolling event, until the follower bar is caused to rise in the vicinity of peripheral region B of the cammed plates and a braking force is applied.

If so desired, a cammed plate coaxial with a guide wheel may be configured without a circular peripheral portion. In this embodiment, the cammed plate may have a rectangular periphery or any other configured periphery whose bottom peripheral edge, when the follower bar is in a starting position, only slightly extends below the aperture by which the plate is mounted on the post. The upper peripheral edge, when the follower bar is in a starting position, may be configured similarly to the cammed plates of FIG. 6, or alternatively, may have a straight periphery which is substantially parallel to the bottom edge, with the addition of a single cammed surface for use in either the uphill mode or downhill mode, depending on the configuration of the cammed surface. A limiting element for preventing axial displacement of the guide wheel and/or cammed plate may be used.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A gravity reactive braking system, comprising:
    a) a housing connected to one or more structural elements of a manually powered wheeled unit;
    b) a guide wheel configured with at least one sector of radially protruding elements positionable in drivable contact with a periphery of a main wheel of the wheeled unit, and with at least one sector having a circular periphery which is configured without any of said radially protruding elements and of a shorter radial length than said at least one sector of radially protruding elements;
    c) a plate configured with a cammed surface;
    d) a height adjustment unit secured to said housing, for selectively retaining a horizontal post on which said guide wheel and said cammed plate are rotatably and coaxially mounted at one of a plurality of vertically spaced positions; and
    e) a follower element connected to a cable of a brake assembly and pivotably mounted onto said housing, for movably engaging a periphery of said plate,
    wherein said guide wheel is rotatable in a rotational direction opposite to the rotational direction of the main wheel when the radially protruding elements of a given one of the sectors of said guide wheel are positioned in drivable contact with said main wheel periphery following suitable manipulation of said height adjustment unit, and is indexable a predetermined angle subtended by said given sector until a desired region of said guide wheel is placed in contact with said main wheel periphery,
    wherein rotation of said plate is synchronized with rotation of said guide wheel to ensure that said follower element will be engaged with said cammed surface and will be consequently caused to rise and to thereby increase tension in the cable for applying a braking force onto said main wheel in conjunction with said brake assembly, when said desired region of said guide wheel is placed in contact with said main wheel periphery.

2. The braking system according to claim 1, which is operable in a downhill mode when the post is set to a lowermost height and an intermediate-level braking force is applied to one or more of the main wheels which are advancing in a downhill direction.

3. The braking system according to claim 2, wherein the cammed surface with which the follower element is engageable and by which it is consequently caused to rise is a concave seating peripheral portion, the radially protruding elements of the given sector of the guide wheel being positionable in drivable contact with the periphery of the main wheel to cause rotation of the guide wheel until the follower element is received in said seating peripheral portion to prevent further rotation of the guide wheel.

4. The braking system according to claim 3, wherein the guide wheel is also configured with a ramped surface tangentially extending from the circular periphery thereof to an adjacent transitional region, to facilitate application of an intermediate-level braking force and sliding of the main wheel along said ramped surface even though further rotation of the guide wheel is prevented by the engagement between the follower element and the seating peripheral portion.

5. The braking system according to claim 3, wherein the main wheel is movable in a reverse direction during the downhill mode, whereupon a detent causes the guide wheel to be locked to prevent return of the follower element to the seating peripheral portion after being disengaged therefrom.

6. The braking system according to claim 5, wherein the guide wheel is configured with one or more detents that extends tangentially from one of the circular periphery sectors and that has a seat, the braking system further comprising a pivotable lever mounted onto the housing such that an unattached end of said lever is rollingly engageable with said one circular periphery sector and is receivable in the seat of each of said one or more detents following movement of the main wheel to lock the guide wheel.

7. The braking system according to claim 1, which is operable in an uphill mode to apply a braking force onto the main wheel during an unanticipated downhill rolling event.

8. The braking system according to claim 7, which is operable in the uphill mode to cause the guide wheel to be driven in a first rotational direction to a standby position such that a first transitional tooth region of the given sector is set in drivable contact with the main wheel periphery, while the wheeled unit is advancing in an uphill direction.

9. The braking system according to claim 8, wherein the guide wheel is configured to be indexed for the predetermined angle subtended by the given sector in in a second rotational direction opposite to the first direction, from the standby position until a second transitional tooth region of the given sector is positioned in drivable contact with the main wheel periphery, during the unanticipated downhill rolling event.

10. The braking system according to claim 9, wherein the cammed surface with which the follower element is engageable and by which it is consequently caused to rise is an upper arcuate peripheral portion of the plate which is separated by a varied distance from a central aperture of the plate adapted for mounting on the horizontal post.

11. The braking system according to claim 10, wherein the plate is also configured with a circular peripheral portion having a radius greater than the distance from the central aperture of the plate to the arcuate peripheral portion, an interface between the arcuate peripheral portion and the circular peripheral portion constituting a region along the arcuate peripheral portion which is spaced by the longest distance from the central aperture and therefore provides maximum rise of the follower element.

12. The braking system according to claim 11, wherein the guide wheel is configured with two adjacent sectors of radially protruding elements, a first of said two sectors usable in the uphill mode and a second of said two sectors usable in a downhill mode during which an intermediate-level braking force is applied to one or more of the main wheels which are advancing in a downhill direction, wherein the radially protruding elements of said first sector are of a different size than the radially protruding elements of said second sector.

13. The braking system according to claim 12, wherein the plate is also configured with a concave seating peripheral portion extending continuously from one end of the arcuate peripheral portion to one end of the circular peripheral portion, the radially protruding elements of the given sector of the guide wheel being positionable in drivable contact with the periphery of the main wheel in the downhill mode to cause rotation of the guide wheel until the follower element is received in said seating peripheral portion to prevent further rotation of the guide wheel.

14. The braking system according to claim 11, wherein the circular peripheral portion of the plate subtends an angle of greater than 180 degrees.

15. The braking system according to claim 9, wherein the guide wheel is configured with one sector of radially protruding elements.

16. The braking system according to claim 1, which is operable in a level mode when the post is set to an uppermost height to ensure that all of the radially protruding elements will be spaced above the main wheel periphery and that the guide wheel will remain at a same angular position due to lack of contact between the radially protruding elements and the main wheel.

17. The braking system according to claim 1, wherein each of the radially protruding elements is configured as a tooth.

18. The braking system according to claim 1, wherein each of the radially protruding elements is rounded, to permit a sliding action with respect to the main wheel when the wheeled unit is moved in a reverse direction.

19. The braking system according to claim 1, which comprises two of the cammed plates which are both rotatably and coaxially mounted on the horizontal plate, wherein the follower element is follower bar terminating with inner and outer rollers for rollingly engaging the periphery of said two cammed plates, respectively.

20. The braking system according to claim 1, wherein the guide wheel or cammed plate is produced by additive manufacturing.

* * * * *